Jan. 8, 1946. H. J. SCHNEIDER ET AL 2,392,772
FLUID PRESSURE ACTUATING MECHANISM
Filed Dec. 7, 1943 3 Sheets-Sheet 1
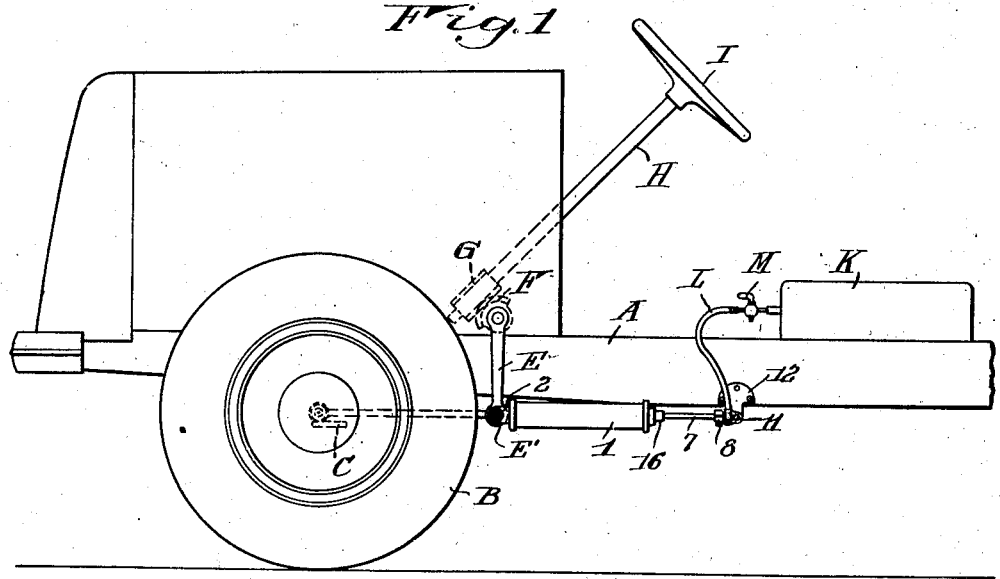
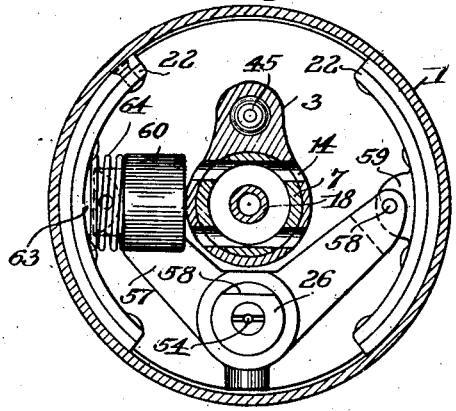
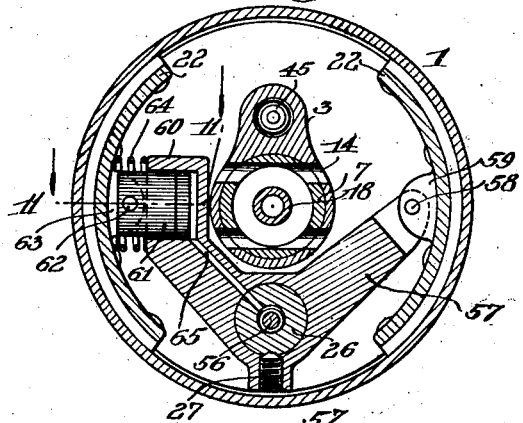
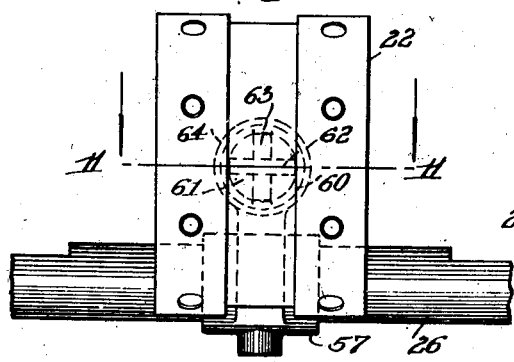
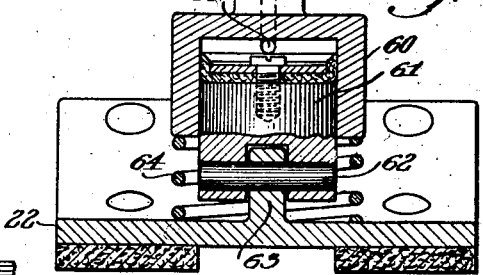
INVENTORS
Henry J. Schneider,
Leon G. Simpson, deceased
BY Ethel V. Simpson, administratrix
their Attorney Jan. 8, 1946.   H. J. SCHNEIDER ET AL   2,392,772
FLUID PRESSURE ACTUATING MECHANISM
Filed Dec. 7, 1943   3 Sheets-Sheet 2
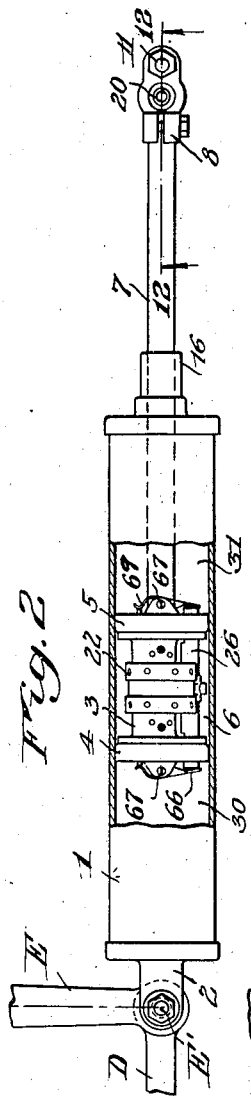
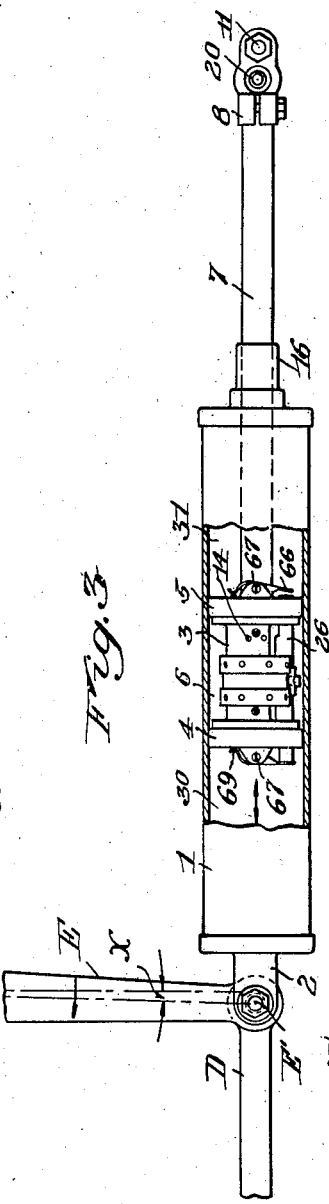
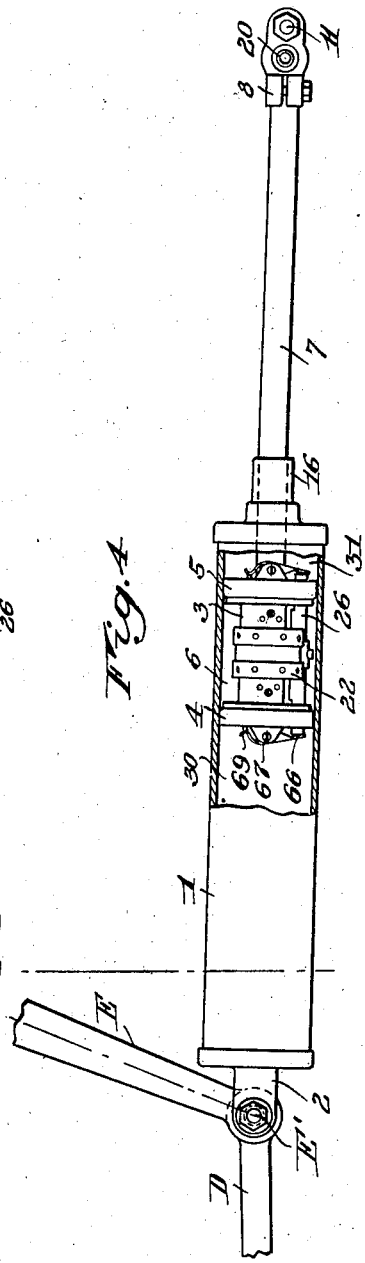
INVENTORS
Henry J. Schneider
Leon G. Simpson, deceased
BY Ethel V. Simpson, administratrix
Their Attorney

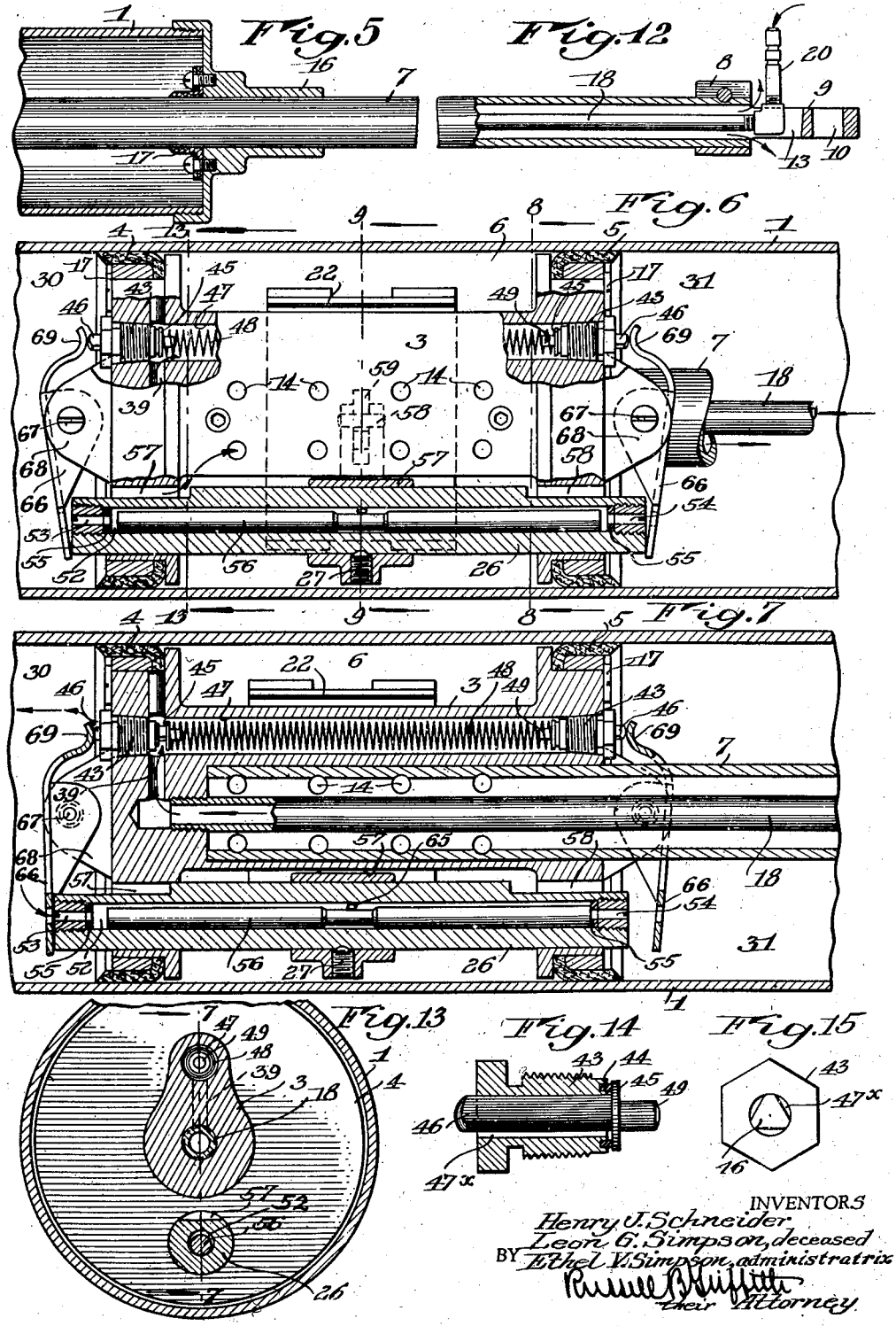

Patented Jan. 8, 1946

2,392,772

UNITED STATES PATENT OFFICE 2,392,772

FLUID PRESSURE ACTUATING MECHANISM

Henry J. Schneider, Rochester, N. Y., and Leon G. Simpson, deceased, late of Inglewood, Calif., by Ethel V. Simpson, administratrix, Rochester, N. Y.

Application December 7, 1943, Serial No. 514,584
In Canada July 27, 1942

5 Claims. (Cl. 121—38)

Our present invention relates to fluid pressure actuators of a type in which a preliminary manual operation sets the actuator in motion and an opposite movement of the manual device stalls and ultimately reverses the action of said actuator. Devices of this nature can be applied to various mechanical problems, but they are particularly applicable to the steering gears of automotive vehicles in attachment with which they have the effect of applying what is called "boosting" pressure on the steering gear of the vehicle and thereby reducing the aforesaid manual effort in turning the ground wheels to a minimum. It is in such an environment that we choose to describe our invention and we have so illustrated an embodiment thereof, it being borne in mind, nevertheless, that there are certain features of the invention that are particularly applicable in connection with steering gears per se.

An object of the invention is to provide a device of this general nature that will be sensitive to control, powerful in its effect and simple both in its construction and its application to either existing vehicles or as a matter of standard equipment on the steering mechanisms of vehicles specially designed for cooperation therewith.

We had issued to us, January 20, 1942, Patent No. 2,270,742, on the same general type of mechanism. The present invention constitutes an improvement thereon. In the cited prior patent springs were illustrated and described as tensioning means for supplying frictional resistance to a certain controlling part that was required to be delayed in its action. With the present invention these springs are eliminated and air pressure utilized instead in a particular way to the end that chattering or "popping" as it is called, of the valve controlling member as it shifts from one direction to the other is eliminated. In other words, useless sensitiveness of the valve controlling member is avoided.

Another improvement over the device of our said earlier patent is the construction and mode of operation of the intake and exhaust valves to eliminate leakage, arising, in the earlier construction, from difficulties of machining and fitting the reciprocatory valve thereshown though the same principle is utilized to provide an actuator for the new valves, all as will be duly described.

To these and other ends, the invention resides in certain improvements and combinations of parts, all as will be hereinafter more fully described, the novel features being pointed out in the claims at the end of this specification.

In the drawings:

Figure 1 is a side elevation of a portion of the chassis of a motor vehicle with a device constructed in accordance with and constituting one embodiment of our invention applied to the steering mechanism thereof;

Figure 2 is an enlarged side elevation partly in longitudinal central section through the cylinder case only of the actuator and connected parts in normal (neutral) positions;

Figure 3 is a view similar to Figure 2 showing the positions of the parts when the manually operated steering gear of Figure 1 is brought into use to turn the wheels of the vehicle in one direction, namely, to the right;

Figure 4 is a view similar to Figures 2 and 3, showing what happens when the fluid pressure actuator picks up the movement of the steering column and carries on, without further effort by the driver, in the turning of the wheels by such fluid pressure;

Figure 5 is a further enlarged detail in longitudinal, central section through the rear cylinder head and adjacent parts;

Figure 6 is a still further enlarged, fragmentary, central, vertical section through the front end of the cylinder, the piston, and adjacent parts, all parts being in positions corresponding to that of Figure 2;

Figure 7 is a view similar to Figure 6 with the parts corresponding to the positions shown in Figure 3, the section being on the line 7—7 of Figure 13;

Figure 8 is a transverse section taken in a plane indicated by the line 8—8 of Figure 6, looking in the direction of the arrows;

Figure 9 is a transverse section in a plane taken on the line 9—9 of Figure 6;

Figure 10 is a detail side elevation of the friction sleeve and valve actuator shown in end elevation in Figure 8 and in central transverse section in Figure 9;

Figure 11 is a further enlarged horizontal fragmentary detail section through the same parts taken on the line 11—11 of Figure 9;

Figure 12 is a greatly enlarged horizontal section of the piston rod bearing on its wrist pin with fragmentary parts taken on the line 12—12 of Figure 2, looking in the direction of the arrows;

Figure 13 is a section taken on the line 13—13 of Figure 6;

Figure 14 is an enlarged detail axial section of one of the poppet valves shown in Figures 6 and 7;

Figure 15 is an enlarged end view of said valve.

Similar reference numerals throughout the several views indicate the same parts.

To first give a general idea of the construction and mode of operation of our invention with particular reference to its illustrated embodiment, the fluid pressure or pneumatic couple comprises a relatively fixed piston and a movable cylinder. The latter is connected to an operating element of the steering gear of the vehicle, while the piston rod is connected to react against a fixed part of the chassis. The piston has two piston heads and an intervening chamber through all three of which passes a reciprocatory actuator controlling a valve member provided in each head. The piston rod is hollow, open to the atmosphere and always open to the piston chamber as an exhaust means therefrom. Through the hollow piston rod to one of the heads extends a pressure supply conduit communicating through a suitable port in that head with an intake bore connecting poppet valve members in the respective heads. The actuator itself also acts as a valve and has additional exhaust ports establishing communication, alternatively, between the piston chamber and one of the pressure chambers constituted by the respective piston heads and the adjacent cylinder heads. The valve actuator is fixed to a floating valve carrier located in the piston chamber and sliding with frictional pressure on the walls of the cylinder so that it will either seize and move with the cylinder when the latter is moved or be dislodged and slide relatively to the cylinder under impulse from a certain pressure communicated to the valve member that it carries. In other words, the cylinder, through the carrier, moves the valve actuator slightly in one direction and the valve is returned by the pressure it builds up and of course slides the carrier with it. The valve arrangements are such that when movement of the cylinder is initiated by manual operation of the steering gear of the vehicle in the usual manner, the valve carrier will move slightly along with it, operate the valve actuator and thereby admit pressure to the appropriate cylinder head and pressure chamber to powerfully supplement the manual operation and actuate the steering gear as desired. As soon as sufficient pressure is built up in the pressure chamber and the steering wheel is held or slightly reversed, the carrier sleeve and valve are returned by the tendency of that pressure against the latter, whereupon the pressure chamber is exhausted into the piston chamber and thence through the hollow connecting rod to the atmosphere. The same thing occurs in reverse through the pressure chamber at the other end of the cylinder when the manually operated gearing is similarly manipulated.

Referring more particularly to the drawings and first to Figures 1 to 4 thereof, the vehicular environment of the device will be readily recognized by those skilled in the art and has been therefore rather conventionally shown to include a chassis frame A with front steering ground wheels B and radius mechanism C connected by a thrust rod D with the swinging pitman E at the pin E'. The segment F of the latter meshes with a worm G on steering post H having a hand wheel I. A forward swing of the pitman E swings the steering ground wheels for a right-hand turn and vice versa. Carried on the chassis is a fluid pressure (preferably air) tank or source K connected by a pipe L with our actuating device as hereinafter later described. The forward head of the cylinder 1 is pivoted at 2 on the pitman pin E'. The piston therein is indicated generally at 3 comprising the opposite heads 4 and 5 with an intervening annular exhaust chamber 6 formed therebetween. The piston rod 7, as aforesaid, is hollow and extends from the forward piston head through the piston and rear head and through the rear cylinder head of course, the latter being provided with an extended bearing 16 and suitable stuffing 17 as shown in detail in Figure 12. At its rear end it is clamped by the split collar 8 thereof to a bearing fitting 9 having a bearing 10 engaging a wrist pin 11 on a fixed bracket 12 on the chassis A. This fitting has an opening 13 through which, as indicated by the arrows, the hollow piston rods exhausts to the atmosphere. At its inner or forward end, it is similarly in constant exhausting communication through open ports 14 with piston chamber 15 (Figure 6).

Extending through the hollow piston rod is a similarly tubular pressure supply conduit or pipe 18 threaded into a recess 19 in the forward cylinder head 4. Its rear end with suitable fittings passes out through opening 13 in bearing fitting 9 close to the wrist pin center 8 and terminates in a suitable laterally disposed nipple 20 to which is attached the previously described pressure supply pipe L.

The piston heads 4 and 5 are, of course, provided with suitable packing rings, detachably held in place by the screws 17.

The valve carrier before mentioned occupies the piston chamber 15 and, referring more particularly to Figures 6, 8 and 10, comprises essentially a split sleeve 22 that is in effect a pair of opposed shoes partially surrounding the central reduced portion of the piston 3 but not greatly obstructing piston chamber 15 with regard to which latter it is of lesser length so that it has a limited sliding play with reference thereto in both directions.

Its periphery or the shoe surfaces are covered with a frictional packing 25 of somewhat the nature of a brake lining so that while it slides in the cylinder it tends to move therewith in either direction under the influence of pitman E until opposed in the manner hereinafter described. It is also so moved relatively to the cylinder and the chamber 15 by the valve member and valve actuator under the pressure influence communicated to the latter as hereinafter described.

Extending through slide bearings in both piston heads 4 and 5 and the chamber 15 at a point offset from the center is this valve member and valve actuator 26 that is carried by the sleeve 22, being fixed to the latter, in the present instance, by a set screw 27 (Figures 6 and 9). It is longer than the piston and, in the normal or neutral positions of Figures 2 and 6, projects from both heads thereof, namely, into the pressure chambers 30 and 31 formed respectively by the piston head 4 and the forward end of the cylinder and the piston head 5 and the rear cylinder head. This valve member is preferably cylindrical and is tubular to form an interior pressure chamber 52 with plugged ends having ports 53 and 54 therein, respectively, provided with suitable non-metallic valve seats 55 at their inner ends. Resting loosely in the chamber 52 is a free floating valve rod 56 that is long enough to permit itself only a slight longitudinal movement in either direction. When so moved extremely it engages a seat 55 and closes one or the other port 53—54.

The ends of valve member and actuator 26 are flattened and cut back a ways on one side to form exhaust ports 57 and 58.

When it and all parts are in the normal position of Figure 6 both of these ports are open as are ports 53 and 54 and both piston pressure chambers 30 and 31, intermediate piston chamber 15, and pressure chamber 52 are all in communication under neutralized air pressure. But when member 26 is, under the seizing or braking effect of shoes 22 on the cylinder, moved slightly with the latter, the lengths of the ports 57 and 58 are such that one of them will enter the piston head 4 or 5 and close communication between that pressure 30 or 31 and central piston chamber 15 while the other one will open wider.

The carrier sleeve or the shoes 22 that comprise it are caused to hug and, on occasion, seize the walls of the cylinder 1 under the influence of air pressure other than that in the intermediate piston chamber in which they are confined. To this end they are connected in the following manner to the valve member:

Referring more particularly to Figures 8 to 11, the friction carrier embodies a yoke 57 through the knee of which passes the set screw 27 that holds it and valve actuator 26 rigidly together. One of the shoes 22 is pivoted to one arm of the yoke at 58 by means of an ear 59. The other arm terminates in a cylinder 60 containing a piston 61 mounted with a wrist pin 62 upon an ear 63 on the other shoe 22. A spring 64 interposed between the latter and the yoke holds the shoe lightly against the cylinder wall whatever the pressure in the cylinder. A passage 65 leads from the cylinder down the yoke arm and through valve member 26 to pressure chamber 52 therein so that the pressure in that chamber controls the pressure in cylinder 60 acting against 61.

When this pressure is positive relatively to the intermediate chamber in which the parts lie, the attached shoe will seize against the cylinder and the reaction will cause the opposite shoe to act in the same manner against the opposite wall.

Leaving this group of parts for the moment without further reference to their functions we will now describe the poppet valves by which pressure is admitted, selectively, to the respective cylinder head pressure chambers 30—31.

These poppet valves embody valve cages consisting of plugs 43 screwed into the piston heads from the outer faces thereof, the two valves being identical. Each, on its inner end, has a seat 44 for a head 45 guided by its stem 46 in a valve stem bore or bearing 47x in the plug. The stem 46 is reduced to a triangular cross sectional area as appears in Figure 15 so that it will pass air through the bore and intake passage 47 when the head 45 is unseated and supply the pressure chambers 30 and 31.

Aligned with the valve plugs is a bore or chamber 47 extending all the way through the piston and both heads thereof in the ends of which bore the end plugs are screwed.

A compression spring 48 occupies this chamber with its ends centered on pins 49 on the respective valve heads so that its tendency is to maintain both valves closed. The tubular air pressure supply conduit or pipe 18 communicates with an intake port and passage 39 in a piston head 4 leading to chamber 47. Thus, when the valve in that head is opened, air under pressure is supplied through it to pressure chamber 30.

The valves are unseated at this remote point through the medium of yoke levers 66 pivoted at 67 on brackets 68 projecting from the piston heads. A curved finger 69 on one arm of the lever engages the end of valve stem 46 while the other and longer arm is contacted by an end of reciprocating element 26. The result is that movements of the latter in either direction from the neutral position of Figure 6 unseats one while leaving the other undisturbed.

The exhaust ports 14 are shown to extend horizontally through the hollow piston rod 7 and piston 3 to establish exhaust communication to the atmosphere from the chamber between the heads.

The operation of the device is as follows:

Assume that the parts are in the normal positions of Figures 1, 2 and 6, that is, with the vehicle traveling strait ahead, the piston 3 at the center of cylinder 1 and the valve carrier 22 centrally of the piston chamber 6. In such a case both intake valves 45 are closed by spring 48. Assuming that the driver wishes to turn right, he gives the steering wheel that sort of an impulse which, through pitman E, carries the cylinder forward slightly with reference to the piston a distance indicated by the arc x in Figure 3. There being nothing to oppose its frictional engagement therewith under the preliminary pressure of spring 64, carrier sleeve 22 moves the same distance along with it taking actuator 26 along with it.

Such lock between carrier 26 and the cylinder is sufficient to cause the former to trip forward lever 69 and open forward intake valve 45 and pressure from the supply conduit is delivered to and built up in forward pressure chamber 30, exhaust port 57 being sealed at its inner end but exhaust port 58 for rear pressure chamber 31 being still open to piston chamber 15. Thus chamber 31 is open to the atmosphere through the hollow piston rod and no resisting compression can develop therein. This also terminates for the moment the necessary manual exertion on the steering wheel for the fluid pressure thereupon does the work reacting against piston head 4 and continuing the cylinder in its forward movement.

In the meantime, air has instantly (with the opening of valve 45) rushed through port 53 in valve chamber 52 and, impinging on the forward end of free valve rod 56 has projected it rearwardly and closed port 54. Thus the pressure also builds up in 52 which, through passage 65, is communicated to cylinder 60 of the carrier causing piston 61 to press sleeve shoes 22 with greater friction against the cylinder walls and maintain valve member actuator 26 in position. In this way the resistance of the friction carrier is directly proportional to the work done. It is not heavy at all times as with the springs of our previous patent and hence is more sensitive in application and release which is an important feature of our invention. Upon doing its work this pressure is built up sufficiently to act directly upon valve member 26 overcoming the friction of its carrier and closing again the intake port 39. At any rate, exhaust port 40 is thereupon opened into piston chamber 15 and pressure chamber 30 is relieved, as earlier described, so that the two pressure chambers reassume a balance. Valve 26 is very sensitive and the pressure builds up very rapidly in chamber 30. Hence, even though the communication 39—32—35 from the incoming fluid is quickly cut off, the valve member continues to move to the right in Figure 7 until the groove 40 establishes communication between 15 and 30. In the meantime, bore 29 and its rear port 34 have been sealed by piston head 5 while the exhaust port for rear pressure chamber 21 has been continuously in communication with piston chamber 15 to relieve any pressure on piston head 5 due to compression therein. It will also be apparent that continued turning of the steering wheel to the left will set up the same sequence of happenings in a reverse direction with the forward intake valve closed and that exhaust port open.

The extreme combined manual and fluid pressure actuation of the cylinder and the restoration of the valve and valve carrier to normal is illustrated in Figure 4. It may be here explained that at no time can the pressure in either pressure chamber be so raised and maintained as to cause the piston to contact either cylinder head. An extreme is shown in Figure 4. This is because the cylinder is made longer than any possible throw of the pitman E. Also inasmuch as the pneumatic couple, it will be borne in mind, is working against a worm and segment gear G—F, it can not itself operate the steering mechanism or cause any resistance to the driver. The latter simply turns the wheel lightly as long as he wants to turn the ground wheels and then holds it steady, whereupon the above described automatic release of the valve will occur. At no time is he required to turn the wheel more than the arc X and that at a time when it does not meet with resistance from the couple.

In fact, the valve will keep operating back and forth on slight curves in open driving where the manual effort is so small that it is not worth while calling in the booster, the many right angle turns required in city driving or in traffic or in turning around being where the device is most appreciated.

Therefore, in open driving the booster can be temporarily thrown out of operation by turning a valve M in the pressure line L arranged conveniently to the driver, as indicated in Figure 1.

Of course, it will be obvious to those skilled in the art that our device may be operated through reversal by vacuum instead of positive pressure, vacuum, of course, being merely negative pressure. In other words, and in general, by forcibly exhausting, the atmosphere, to the extent of its weight, can be utilized as the positive pressure medium. In such a case, in general, opening 13 would communicate with the vacuum while conduit 18 would communicate the atmospheric pressure.

Our invention is particularly useful in connection with the larger vehicles such as heavy duty trucks, tractors and passenger buses, the steering of which by manually operated means alone is an exhausting as well as a relatively slow procedure.

We claim as our invention:

1. In a fluid pressure actuator, the combination with a pneumatic couple comprising a cylinder and a two headed piston operating therein with a chamber between the piston heads, and a tubular piston rod acting as an exhaust and extending from the piston chamber through and the piston and through a head of the cylinder, the cylinder and the piston rod being adapted for connection, one with a fixed part and the other with the element to be actuated, of a frictional valve carrier within the piston chamber so engaging the cylinder walls between the piston heads, a valve member in the carrier extending through and reciprocatable in both piston heads, and a tubular pressure supply conduit extending through the piston rod, certain of the aforementioned parts being respectively provided with the following, namely, an exhaust port leading from the piston chamber to the piston rod, an exhaust port leading from the latter to the atmosphere, a passage leading from the pressure supply conduit to each pressure chamber between one or another piston head and the adjacent cylinder head, an intake valve independent of the reciprocating valve member in each of said passages, ports controlled by the position of the reciprocatable valve member adapted to alternately communicate exhaust from the respective pressure chambers to the piston chamber with reciprocations of such valve member such, for opening the intake valve of one pressure chamber when the exhaust port of the other is opened.

2. In a fluid pressure actuator, the combination with a pneumatic couple comprising a cylinder and a two-headed piston operating therein with a chamber between the piston heads, and a tubular piston rod acting as an exhaust and extending from the piston chamber through the piston and through a head of the cylinder, the cylinder and the piston rod being adapted for connection, one with a fixed part and the other with the element to be actuated, of a frictional valve carrier within the piston chamber so engaging the cylinder walls between the piston heads, a valve member in the carrier extending through and reciprocatable in both piston heads, and a tubular pressure supply conduit extending through the piston rod, certain of the aforementioned parts being respectively provided with the following, namely, an exhaust port leading from the piston chamber to the piston rod, an exhaust port leading from the latter to the atmosphere, a continuous chamber leading through the piston and embodying a passage leading from the pressure supply conduit to each pressure chamber between one or another piston head and the adjacent cylinder head, a poppet intake valve separate from the reciprocatory valve in each of such passages in each cylinder head, a compression spring in the chamber acting against both valves to normally maintain them seated, ports controlled by the reciprocatable valve member adapted to alternately communicate exhaust from the respective pressure chambers to the piston chamber with reciprocations of such valve member, and means actuated by the valve member for opening the intake valve of one pressure chamber when the exhaust port of the other is opened.

3. In a fluid pressure actuator, the combination with a pneumatic couple comprising a cylinder and a two-headed piston operating therein with a chamber between the piston heads, and a tubular piston rod acting as an exhaust and extending from the piston chamber through the piston and through a head of the cylinder, the cylinder and the piston rod being adapted for connection, one with a fixed part and the other with the element to be actuated, of a frictional valve carrier within the piston chamber so engaging the cylinder walls between the piston heads, a valve member in the carrier extending through and reciprocatable in both piston heads, and a tubular pressure supply conduit extending through the piston rod, certain of the aforementioned parts being respectively provided with the following, namely, an exhaust port leading from the piston chamber to the piston rod, an exhaust port leading from the latter to the atmosphere, a passage leading from the pressure supply conduit to each pressure chamber between one or another piston head and the adjacent cylinder head, a poppet intake valve separate from the reciprocatory valve in each of said passages having a stem accessible from the chamber ports, ports controlled by the position of the reciprocatable valve member adapted to alternately communicate exhaust from the respective pressure chambers to the piston chamber with reciprocations of such valve member, and levers mounted on the piston heads to engage the intake valve stems and actuated by the valve member for opening the intake of one pressure chamber when the exhaust port of the other is opened.

4. A fluid pressure actuator constructed in accordance with claim 1 in which the carrier includes friction shoes so engaging the cylinder walls and there is provided further in the combination pneumatically operated means for exerting pressure on the friction shoes proportionately to that in the cylinder head chamber which is under pressure.

5. A fluid pressure actuator constructed in accordance with claim 1 in which the carrier includes friction shoes so engaging the cylinder walls, a yoke having one arm pivoted to one shoe and pivotally connected to the other by a piston and cylinder, the valve member being provided with a pressure chamber having ports at each end leading into the respective cylinder head chambers and a valve rod in such pressure chamber actuated to close one of the last mentioned ports by pressure introduced in the opposite cylinder head chamber, there being a passage in the yoke leading from the valve member chamber to the carrier cylinder and piston.

HENRY J. SCHNEIDER.
ETHEL V. SIMPSON,
*Administratrix of the Estate of Leon G. Simpson, Deceased.*